United States Patent
Kaiduka et al.

(10) Patent No.: US 8,021,786 B2
(45) Date of Patent: *Sep. 20, 2011

(54) NON-AQUEOUS ELECTROLYTE SECONDARY CELL

(75) Inventors: Atsushi Kaiduka, Moriguchi (JP); Masato Iwanaga, Moriguchi (JP); Yukihiro Oki, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 675 days.

This patent is subject to a terminal disclaimer.

(21) Appl. No.: 12/059,196

(22) Filed: Mar. 31, 2008

(65) Prior Publication Data

US 2008/0241694 A1 Oct. 2, 2008

(30) Foreign Application Priority Data

Mar. 29, 2007 (JP) .................. 2007-087933

(51) Int. Cl.
*H01M 4/48* (2010.01)

(52) U.S. Cl. ............... 429/231.3; 429/231.1; 429/231.6; 429/231.5; 429/218.1; 429/249; 429/247; 429/129

(58) Field of Classification Search ............... 429/231.3, 429/231.1, 231.6, 231.5, 218.1, 249, 247, 429/129

See application file for complete search history.

(56) References Cited

U.S. PATENT DOCUMENTS

| 4,465,747 | A | 8/1984 | Evans |
| 5,928,812 | A | 7/1999 | Xue |
| 5,962,167 | A | 10/1999 | Nakai et al. |
| 6,582,852 | B1 | 6/2003 | Gao et al. |
| 2005/0069774 | A1 | 3/2005 | Miyazaki et al. |
| 2006/0115733 | A1 | 6/2006 | Nishida et al. |
| 2006/0194110 | A1 | 8/2006 | Miyazaki et al. |
| 2006/0194114 | A1 | 8/2006 | Saito |
| 2006/0216605 | A1* | 9/2006 | Shirakata et al. ........... 429/231.3 |
| 2007/0048607 | A1* | 3/2007 | Nakashima et al. .......... 429/251 |
| 2007/0082265 | A1 | 4/2007 | Itou et al. |
| 2007/0207384 | A1* | 9/2007 | Nakura ..................... 429/231.3 |
| 2008/0118839 | A1* | 5/2008 | Yamamoto et al. ........ 429/231.3 |
| 2008/0248392 | A1 | 10/2008 | Takeuchi et al. |

FOREIGN PATENT DOCUMENTS

| CN | 1875505 A | 12/2006 |
| JP | 04-308654 A | 10/1992 |
| JP | 05-159766 A | 6/1993 |
| JP | 09-306547 A | 11/1997 |
| JP | 2003-308842 A | 10/2003 |
| JP | 2005-044675 A | 2/2005 |
| JP | 2005-071641 A | 3/2005 |
| JP | 2005-129489 A | 5/2005 |
| JP | 2005-190996 A | 7/2005 |
| JP | 2006-185793 A | 7/2006 |
| JP | 2006-318839 A | 11/2006 |
| WO | WO 2007/139130 A1 | 12/2007 |

OTHER PUBLICATIONS

European Search Report dated Mar. 18, 2008, issued in corresponding European Patent Application No. 07120633.
English Abstract of the Chinese Reasons for Refusal, dated Jul. 7, 2011, for the corresponding Chinese application No. 200810085225.6.

* cited by examiner

*Primary Examiner* — Laura Weiner

(74) *Attorney, Agent, or Firm* — Westerman, Hattori, Daniels & Adrian, LLP

(57) ABSTRACT

A non-aqueous electrolyte secondary cell superior in resistance against continuous charging at high potential is provided. The non-aqueous electrolyte secondary cell includes: a positive electrode having lithium phosphate and a positive electrode active material comprising lithium cobalt oxide containing at least one selected from Mg, Al, Ti, and Zr; and a separator having pores having an average diameter of 0.05 to 0.2 μm.

9 Claims, No Drawings

NON-AQUEOUS ELECTROLYTE SECONDARY CELL

BACKGROUND OF THE INVENTION

1) Field of the Invention

The present invention relates to an improvement in the cell characteristics of non-aqueous electrolyte secondary cells.

2) Description of the Related Art

Non-aqueous electrolyte secondary cells, for their high energy density, are widely used as power sources for mobile appliances. In recent years, there has been rapid enhancement of functionality of mobile appliances such as mobile phones and laptop computers, resulting in a need for cells of higher capacity.

In order to meet this demand, an attempt is being made to enhance the efficiency of the positive electrode active material by charging the positive electrode to higher potentials (e.g., approximately 4.3 V on the basis of lithium).

However, enhancing the potential of the positive electrode causes generation of a low oxidative substance on the negative electrode. The substance moves to and reacts with the positive electrode, which poses the problem of degraded cycle characteristic and degraded resistance against continuous charging.

Examples of the prior art techniques related to non-aqueous electrolyte secondary cells include Japanese Patent Application Publication Nos. 2005-190996 (patent document 1), 2005-44675 (patent document 2), 2006-185793 (patent document 3), 2006-318839 (patent document 4), 4-308654 (patent document 5), and 5-159766 (patent document 6).

Patent document 1 discloses attaching lithium phosphate to the surface of a lithium nickel oxide. This technique is claimed to provide a cell that prevents decomposition of the electrolytic solution.

This document, however, gives no consideration to charging the positive electrode to high potential.

Patent document 2 discloses a separator of a lamination structure composed of a porous synthetic resin film sandwiched between felt separators mainly made of glass fiber.

This technique is claimed to provide a lead storage battery that prevents sulfation on the negative electrode plate and thus maintain its low-temperature rapid discharge characteristic for a long period of time.

This technique, however, is drawn to lead storage batteries and thus cannot be applied as it is to non-aqueous electrolyte secondary cells.

Patent document 3 discloses a separator with an air permeability of 60 to 400 sec/100 ml and with a porosity of less than 60%. This technique is claimed to provide a cell that excels in charge/discharge characteristic and usable under a high voltage of 4.4 to 4.6 V.

This technique, however, still cannot prevent the low oxidative substance, which is generated on the negative electrode, from moving to and reacting with the positive electrode.

Patent document 4 discloses addition of, to the non-aqueous electrolyte, cyclohexyl benzene, biphenyl, fluorobenzene, and t-alkyl benzene. This technique is claimed to provide a cell that is excellent in resistance against overcharge and does not swell after charged and preserved.

This document, however, gives no consideration to charging the positive electrode to high potential.

Patent document 5 discloses a separator made of a porous film with an aperture ratio of 50% or less and an aperture diameter of 0.3 µm or less. This technique is claimed to provide a cell that prevents internal short circuiting caused by dendrites.

This document, however, gives no consideration to charging the positive electrode to high potential.

Patent document 6 discloses a separator made of a porous polyethylene film with a film thickness of 20 to 30 µm, an air permeability of 200 to 1000 sec/100 ml air (ASTMD), and an average pore diameter of 0.02 to 0.05 µm. This technique is claimed to provide a cell that is excellent in safety against internal short circuiting and in current characteristic.

This document, however, gives no consideration to charging the positive electrode to high potential.

SUMMARY OF THE INVENTION

The present invention has been accomplished in order to solve the above problems, and it is an object of the present invention to provide a non-aqueous electrolyte secondary cell that maintains superior cycle characteristic and resistance against continuous charging even when used at high potential.

In order to accomplish the above-mentioned object, a non-aqueous electrolyte secondary cell according to the present invention includes: a positive electrode having a positive electrode active material; a negative electrode having a negative electrode active material; and a separator between the positive electrode and the negative electrode. The positive electrode contains lithium phosphate. The positive electrode active material comprises lithium cobalt oxide containing at least one element selected from the group consisting of Mg, Al, Ti, and Zr. The separator has pores having an average diameter of 0.05 to 0.2 µm.

The positive electrode in the above configuration has lithium phosphate and a positive electrode active material comprising lithium cobalt oxide containing at least one element selected from the group consisting of Mg, Al, Ti, and Zr. Lithium cobalt oxide containing a different element such as Mg has high stability in its crystal structure at high potential. The lithium phosphate contained in the positive electrode serves to further enhance the stability of the positive electrode at high potential. Thus, this configuration realizes a cell with minimized degradation in performance at high potential.

In the above configuration, the average diameter of the pores of the separator is specified. If the average diameter of the pores of the separator is excessively large, the migration of a low oxidative substance that occurs at the negative electrode cannot be prevented, resulting in degraded resistance against continuous charging. If the average diameter of the pores of the separator is too small, the low oxidative substance occurring at the negative electrode fills up the pores of the separator. This hinders desired conduction of lithium ions, resulting in degraded cycle characteristic. Specifying the average diameter of the pores of the separator to 0.05 to 0.2 µm effectively prevents the migration of the low oxidative substance occurring at the negative electrode. This realizes a cell superior in cycle characteristic and resistance against continuous charging.

In the above configuration the lithium cobalt oxide may be a compound represented by $Li_aCO_{1-x}M_xO_2$ where M denotes an element selected from Mg, Al, Ti, and Zr, a is specified as $0<a<1.1$, and x is specified as $0.00001 \leq x \leq 0.03$.

In order to fully exploit the advantageous effects of the present invention, the content x of the different element is preferably equal to or more than 0.0001. However, a content x of excess of 0.03 for the different element degrades the cell capacity, which is not preferable. Thus, the content x is preferably equal or less than 0.03.

In the above configuration, the lithium phosphate in the positive electrode may have a content ratio by mass of 0.01 to 5.0 relative to the mass of the positive electrode active material when the mass of the positive electrode active material is assumed to be 100.

If the content of the lithium phosphate is too small, the advantageous effects of the lithium phosphate cannot be obtained sufficiently. However, since the lithium phosphate is not a contributory substance to charging and discharging, containing of it in an excessively large amount causes degradation of the discharge capacity. Thus, the content of the lithium phosphate is preferably specified within the claimed range.

In the above configuration, the separator may be made of polyethylene and polypropylene.

A preferable condition for preparing a separator of this physical property is richness in polyethylene; however, a separator made of polyethylene alone has poor stability at high potential. In view of this, polypropylene, which has high chemical stability at high potential, is preferably contained.

In the above configuration, the content of the polypropylene in the separator may be 0.1 to 15 mass %.

If the content of the polypropylene is too small, the advantageous effects of the polypropylene cannot be obtained sufficiently. If, on the other hand, the content of the polypropylene is excessively large, control of the pore diameter of the separator becomes difficult. In view of this, the content of the polypropylene is preferably 0.1 to 15 mass %.

In the above configuration, the positive electrode active material may have a potential of 4.4 to 4.6 V on the basis of lithium.

The advantageous effects of the above aspects of the present invention can be best exploited when the potential of the positive electrode active material is 4.4 to 4.6 V on the basis of lithium. However, if the potential of the positive electrode active material exceeds 4.6 V on the basis of lithium, the stability of the lithium cobalt oxide containing a different element is degraded, resulting in degraded discharge characteristic. In view of this, the potential of the positive electrode active material is preferably specified to 4.4 to 4.6 V on the basis of lithium.

Thus, the present invention with the above configuration provides a high-capacity non-aqueous electrolyte secondary cell that has superior cycle characteristic and superior resistance against continuous charging, and that functions desirably at high potential.

DESCRIPTION OF THE PREFERRED EMBODIMENTS

The preferred embodiments of the present invention will be described with reference to examples. It will be understood that the present invention will not be limited by the embodiments below; modifications are possible without departing from the scope of the present invention.

Example 1

Preparation of the Positive Electrode

Cobalt (Co), zirconium (Zr), aluminum (Al), and magnesium (Mg) were co-precipitated to have a thermal decomposition reaction, thus obtaining tricobalt tetraoxide containing zirconium, aluminum, and magnesium. The tricobalt tetraoxide was mixed with lithium carbonate, and then baked in an air atmosphere at 850° C. for 24 hours, followed by cracking, thus obtaining lithium-cobalt composite oxide containing zirconium and magnesium (positive electrode active material A: $LiCo_{0.973}Mg_{0.005}Al_{0.02}Zr0.002O_2$).

Lithium carbonate and a co-precipitated hydroxide represented by $Ni_{0.33}Co_{0.34}Mn_{0.33}(OH)_2$ were mixed, and then baked in an air atmosphere at 1000° C. for 20 hours, followed by grinding in a mortar to an average diameter of 5 μm, thus obtaining lithium nickel-manganese oxide containing cobalt (positive electrode active material B: $LiNi_{0.33}Co_{0.34}Mn_{0.33}O_2$).

An X-ray crystal structure analysis of the positive electrode active material B revealed that the material had a layer structure.

The positive electrode active material A and the positive electrode active material B were mixed with one another at a mass ratio of 9:1, and to 99 mass parts of this mixture, 1 mass part of lithium phosphate was added and further mixed. The average diameter (median diameter) of the lithium phosphate was 2 μm.

The average diameter (median diameter) was measured with a laser-diffraction type grain size distribution measuring device after well distributing the lithium phosphate in distilled water using ultrasound or a surface active agent.

Ninety-four mass parts of the mixture, 3 mass parts of carbon powder as a conducting agent, 3 mass parts of polyvinylidene fluoride (PVDF) as a binding agent, and N-Methyl-2-Pyrrolidone (NMP) were mixed together, thus preparing a positive electrode active material slurry. This positive electrode active material slurry was applied to both surfaces of a positive electrode current collector (15 μm thick) made of an aluminum foil by doctor blading, followed by drying to remove the solvent (NMP) required during slurry preparation.

Then, the dried electrode plate was rolled to a thickness of 0.13 mm, thus completing a positive electrode.

<Preparation of the Negative Electrode>

Ninety-six mass parts of a negative electrode active material made of graphite, 2 mass parts of carboxymethyl cellulose (CMC) as a thickening agent, 2 mass parts of styrene-butadiene rubber (SBR) as a binding agent, and water were mixed together, thus preparing a negative electrode active material slurry.

The negative electrode active material slurry was applied to both surfaces of a negative electrode current collector (8 μm thick) made of copper by doctor blading, followed by drying to remove the water required during slurry preparation.

Then, the dried electrode plate was rolled to a thickness of 0.12 mm, thus preparing a negative electrode.

The potential of graphite is 0.1 V on the basis of lithium. The amounts of the active materials filled in the positive electrode and the negative electrode were adjusted such that the charge capacity ratio (negative electrode charge capacity/positive electrode charge capacity) per unit area would be "negative electrode≧positive electrode" at the potential of the positive electrode active material (4.48 V on the basis of lithium in this example, while the voltage being 4.38 V), which serves as a design reference.

<Preparation of the Separator>

Ninety-nine mass parts of polyethylene (PE) and one mass part of polypropylene (PP) were mixed with one another, and to this mixture an extracting agent made of, for example, liquid paraffin was added, followed by solving and kneading the resulting mixture at 120° C. or higher. The kneaded product was then extruded from a die head while at the same time being subjected to roll cooling molding, followed by heat stretching at 100° C. or higher and immersion in a solvent to extract the extracting agent. Thus, a separator with an average pore diameter of 0.1 μm and a thickness of 18 μm was prepared.

The average diameter of the pores of the separator was measured with a mercury porosimeter.

<Preparation of the Electrode Assembly>

The positive electrode and the negative electrode were wound with the separator therebetween, thus preparing an electrode assembly.

<Preparation of the Non-aqueous Electrolyte>

Twenty volume parts of ethylene carbonate, 50 volume parts of ethyl methyl carbonate, and 30 volume parts of diethyl carbonate were mixed together (25° C., 1 atm.), and then $LiPF_6$ as electrolytic salt was dissolved therein at a concentration of 1.0 (mol/liter), thus obtaining a non-aqueous electrolyte.

<Assembly of the Cell>

The electrode assembly was inserted into an outer casing along with insulation plates, and the opening of the outer casing was sealed with a sealing plate. Thus, a non-aqueous electrolyte secondary cell according to example 1 having the size 5 mm×34 mm×36 mm was prepared.

Example 2

A non-aqueous electrolyte secondary cell according to example 2 was prepared in the same manner as in example 1 except that the separator did not contain polypropylene.

Comparative Example 1

A non-aqueous electrolyte secondary cell according to comparative example 1 was prepared in the same manner as in example 1 except that no lithium phosphate was added and the average pore diameter of the separator was 0.5 μm.

Comparative Example 2

A non-aqueous electrolyte secondary cell according to comparative example 2 was prepared in the same manner as in example 1 except that no lithium phosphate was added.

Comparative Example 3

A non-aqueous electrolyte secondary cell according to comparative example 3 was prepared in the same manner as in example 1 except that a separator prepared in the following manner was used.

Polyethylene and polypropylene were independently solved and extruded from a die head while at the same time being subjected to roll cooling molding. The resulting films were rolled while at the same time being heated at 100° C. or lower. Thus, a separator with a three-layer structure of polypropylene/polyethylene/polypropylene and with an average pore diameter of 0.03 μm and a thickness of 18 μm was prepared.

Comparative Example 4

A non-aqueous electrolyte secondary cell according to comparative example 4 was prepared in the same manner as in example 1 except that the average pore diameter of the separator was 0.5 μm.

<Measurement of Cycle Characteristic>

The cells according to examples 1 and 2 and according to comparative examples 1 to 4 were charged at a constant current of 1 It (850 mA) to a voltage of 4.38 V, then at a constant voltage of 4.4 V to a current of 17 mA.

Then the cells were discharged at a constant current of 1 It (850 mA) to a voltage of 3.0 V. This charge/discharge cycle was repeated 200 times (all in a thermostatic chamber at 45° C.) to calculate a cycle characteristic using the following formula. The results are shown in Table 1.

Cycle characteristic (%)=discharge capacity at 200th cycle/discharge capacity at 1st cycle×100

<Continuous Charging Test>

The cells according to examples 1 and 2 and according to comparative examples 1 to 4 were charged at a constant current of 1 It (850 mA) to a voltage of 4.38 V, then at a constant voltage of 4.4 V to a current of 17 mA. Then the cells were discharged at a constant current of 1 It (850 mA) to a voltage of 3.0 V.

After charging under the above conditions, the fully charged cells were put in a thermostatic chamber of 45° C., where the cells were constantly applied with voltage and current and left to stand for six weeks at a constant voltage of 4.38 V. The cells were then charged under the above conditions to calculate a reversion rate. The results are shown in Table 1.

Reversion rate (%)=discharge capacity after continuous charging/discharge capacity before continuous charging×100

TABLE 1

|  | Separator | | | Cycle characteristic (%) | Reversion rate (%) |
|---|---|---|---|---|---|
|  | Pore diameter (μm) | Composition | Lithium phosphate | | |
| Comparative example 1 | 0.5 | PP1/PE99 | Not contained | 37 | 43 |
| Comparative example 2 | 0.1 | PP1/PE99 | Not contained | 58 | 47 |
| Comparative example 3 | 0.03 | PP/PE/PP | Contained | 54 | — |
| Comparative example 4 | 0.5 | PP1/PE99 | Contained | 81 | 13 |
| Example 1 | 0.1 | PP1/PE99 | Contained | 88 | 65 |
| Example 2 | 0.1 | PE100 | Contained | 82 | 61 |

Table 1 shows that comparative examples 1 and 2, which do not contain lithium phosphate, respectively have cycle characteristics of 37% and 58% and reversion rates of 43% and 47%, which are degraded values compared with 88% and 82% cycle characteristics and 65% and 61% reversion rates of examples 1 and 2, respectively, which contain lithium phosphate.

A possible explanation for this is as follows. The lithium phosphate contained in the positive electrode serves to enhance the stability of the positive electrode at high potential and thus enhance the cycle characteristic and reversion rate.

Table 1 also shows that comparative example 3, which uses a separator with a three-layer structure of polypropylene (PP)/polyethylene (PE)/polypropylene (PP) and with an average pore diameter of 0.03 μm, has a cycle characteristic of 54%, which is a degraded value compared with 88% and 82% cycle characteristics of examples 1 and 2, respectively, which use a separator with an average pore diameter of 0.1 μm.

A possible explanation for this is as follows. If the average diameter of the pores of the separator is too small, a side reaction product of the charge/discharge reactions tends to fill up the pores. This hinders desired conduction of lithium ions. In view of this, the average pore diameter of the separator is preferably more than 0.03 μm, more preferably 0.05 μm or more.

Table 1 also shows that comparative example 4, which uses a separator with an average pore diameter of 0.5 μm, has a reversion rate of 13%, which is a degraded value compared with 65% and 61 reversion rates of examples 1 and 2, respectively, which use a separator with an average pore diameter of 0.1 μm.

A possible explanation for this is as follows. If the average diameter of the pores of the separator is excessively large, the migration of a low oxidative compound that occurs at the negative electrode cannot be prevented. This low oxidative compound reacts with the positive electrode to result in degraded cell characteristic (reversion rate). In view of this, the average pore diameter of the separator is less than 0.5 μm, more preferably 0.2 μm or less.

Table 1 also shows that example 1, which contains polypropylene in the separator, has a cycle characteristic of 88% and a reversion rate of 65%, which are superior to 82% cycle characteristic and 61% reversion rate of example 2, which does not contain polypropylene.

A possible explanation for this is as follows. Polypropylene has higher stability at high potential than polyethylene. Thus, the cell characteristics of example 1 containing polypropylene are enhanced more than those of example 2 not containing polypropylene.

INDUSTRIAL APPLICABILITY

As has been described above, the present invention realizes a non-aqueous electrolyte secondary cell having high cycle characteristic and excellent continuous charging characteristic at high potential. Thus, the industrial applicability of the present invention is considerable.

What is claimed is:

1. A non-aqueous electrolyte secondary cell comprising:
a positive electrode having a positive electrode active material;
a negative electrode having a negative electrode active material; and
a separator between the positive electrode and the negative electrode, wherein:
the positive electrode contains lithium phosphate $Li_3PO_4$;
the positive electrode active material comprises lithium cobalt oxide containing at least one element selected from the group consisting of Mg, Al, Ti, and Zr; and
the separator has pores having an average diameter of 0.05 to 0.2 μm;
wherein the lithium phosphate in the positive electrode has a content ratio by mass of 0.01 to 5.0 relative to the mass of the positive electrode active material when the mass of the positive electrode active material is assumed to be 100.

2. The non-aqueous electrolyte secondary cell according to claim 1, wherein the separator comprises polyethylene and polypropylene.

3. The non-aqueous electrolyte secondary cell according to claim 2, wherein the content of the polypropylene in the separator is 0.1 to 15 mass %.

4. The non-aqueous electrolyte secondary cell according to claim 3, wherein the positive electrode active material has a potential of 4.4 to 4.6 V on the basis of lithium.

5. The non-aqueous electrolyte secondary cell according to claim 1, wherein the lithium cobalt oxide is a compound represented by $Li_aCO_{1-x}M_xO_2$ where M denotes an element selected from Mg, Al, Ti, and Zr, a is specified as $0<a\leqq1.1$, and x is specified as 0.00010.03.

6. The non-aqueous electrolyte secondary cell according to claim 5, wherein the separator comprises polyethylene and polypropylene.

7. The non-aqueous electrolyte secondary cell according to claim 6, wherein the content of the polypropylene in the separator is 0.1 to 15 mass %.

8. The non-aqueous electrolyte secondary cell according to claim 7, wherein the positive electrode active material has a potential of 4.4 to 4.6 V on the basis of lithium.

9. The non-aqueous electrolyte secondary cell according to claim 5, wherein the positive electrode active material has a potential of 4.4 to 4.6 V on the basis of lithium.

* * * * *

UNITED STATES PATENT AND TRADEMARK OFFICE
CERTIFICATE OF CORRECTION

PATENT NO. : 8,021,786 B2
APPLICATION NO. : 12/059196
DATED : September 20, 2011
INVENTOR(S) : Atsushi Kaiduka et al.

It is certified that error appears in the above-identified patent and that said Letters Patent is hereby corrected as shown below:

In claim 5, column 8, line 38:

Please change

"0.00010.03"

to be

-- $0.0001 \leq x \leq 0.03$ --

Signed and Sealed this
Tenth Day of January, 2012

David J. Kappos
*Director of the United States Patent and Trademark Office*